N. POWER.
APPARATUS FOR TREATING FILMS FOR MOTION PICTURE MACHINES.
APPLICATION FILED OCT. 13, 1913.
1,119,115.　　　　　　　　　　　Patented Dec. 1, 1914.
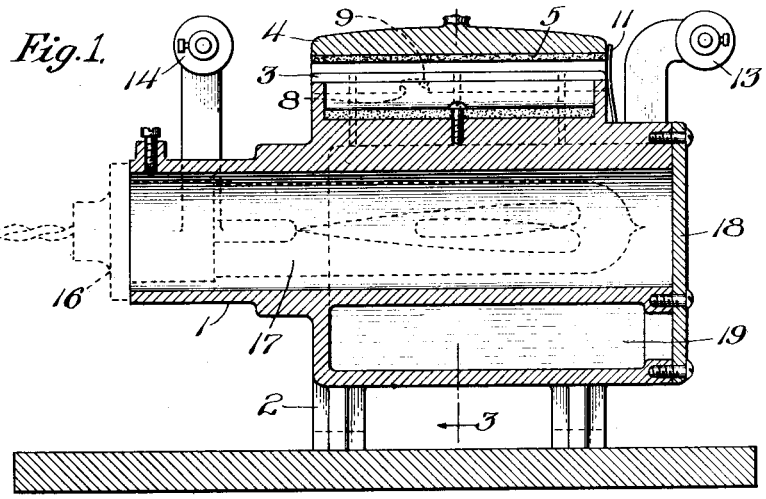
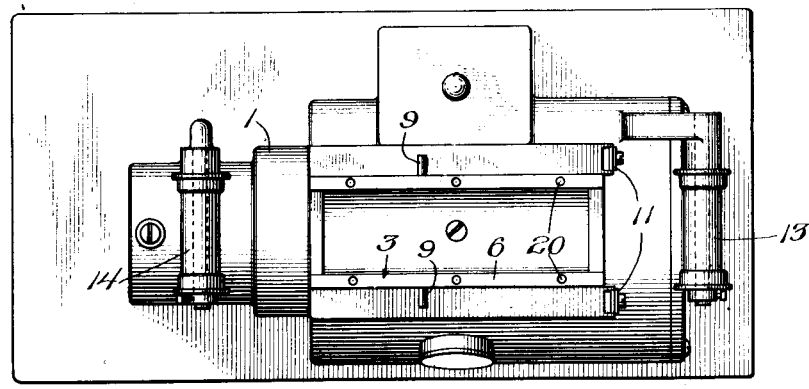
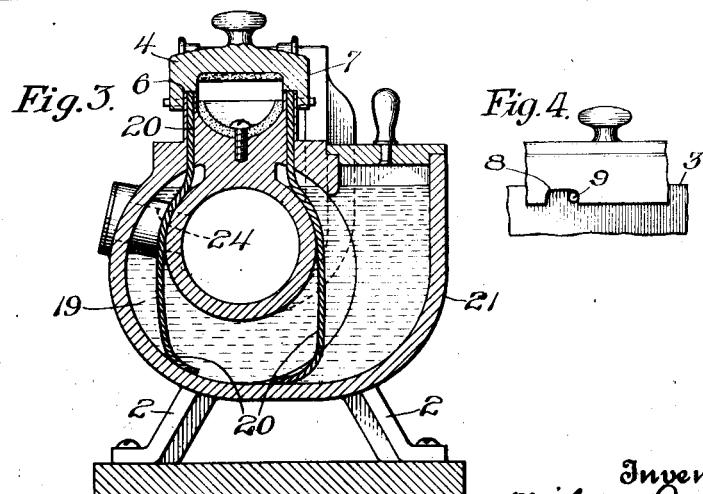
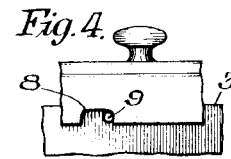
Witnesses:
L. E. Johnston
M. E. Eveland
Inventor
Nicholas Power
By his Attorney
W. B. Morton

UNITED STATES PATENT OFFICE.

NICHOLAS POWER, OF BROOKLYN, NEW YORK.

APPARATUS FOR TREATING FILMS FOR MOTION-PICTURE MACHINES.

1,119,115.  Specification of Letters Patent.  Patented Dec. 1, 1914.

Continuation of application Serial No. 732,429, filed November 18, 1912. This application filed October 13, 1913. Serial No. 794,833.

*To all whom it may concern:*

Be it known that I, NICHOLAS POWER, a citizen of the United States, and a resident of Brooklyn, in the county of Kings and State of New York, have invented new and useful Improvements in Apparatus for Treating Films for Motion-Picture Machines, of which the following is a specification.

This invention relates to apparatus for heat treating films for motion picture projecting machines, and has for its object to provide a device for treating such films which will prevent the films sticking to the guide members of the machine adjacent the projection aperture, or other portions of the machine, during the projection of the picture and thereby damaging the film as well as interfering with the exhibition.

A further object of my invention is to provide an apparatus for this purpose which is of simple and inexpensive construction, not liable to get out of order, and which may be readily operated to effectively treat a considerable length of film in a comparatively short length of time.

In motion picture projecting machines as at present constructed the reel of film is supported in a magazine at the top of the machine and is thence fed downward by intermittently operating sprocket wheels engaging the perforations in the margins of a film, past the projection aperture of the machine. To maintain the film in proper position relative to the aperture during its movement past the same it is guided between two pairs of guides which engage the margins of the film, the guides of each pair being pressed together by a suitable spring construction to exert a sufficient pressure on the film to hold it stationary in proper position relative to the projection aperture in the intervals between the intermittent movement of the feed stroke. The metal forming the guides is right in line with the rays of light from the arc lamp or calcium light of the projecting lantern and soon becomes heated to a temperature considerably above the rest of the machine. It has been found in practice that these hot guides bearing upon the margin of the film tend to melt certain fusible matter on the film, particularly the cement between the joined ends of the different portions of the film comprising the entire reel. The cement and other matter melted off the film collects on the guides to such an extent that it frequently causes the film to adhere to the guides during the movement that it is stationary so that on the next intermittent movement of the feed sprockets the teeth of the sprockets not infrequently tear off portions of the margins of the film, in some instances tearing the film completely in two. I have found that this defect can be obviated by treating the films in the manner hereinafter described, and with the aid of the apparatus shown in the accompanying drawings and forming my invention.

In the said drawings Figure 1 is a longitudinal vertical section of my improved apparatus; Fig. 2 is a plan view of the same; Fig. 3 is a transverse section on line 3—3 of Fig. 1; and Fig. 4 is a detail view which will be hereinafter described.

In describing my invention I will first describe my improved apparatus and then describe the manner in which it is manipulated to obtain the desired results.

Referring now to the drawings, 1 designates a tubular housing provided with legs 2, by which it may be supported on a suitable table or attached to a wall or other surface as may be convenient. Formed integral with the upper surface of the housing are two guides 3 having their outer edges spaced apart a distance equal to the width of the film to be treated, and themselves of a width equal to the aforementioned guides of an ordinary motion picture projecting machine. The portion of the housing connecting the guides 3 is depressed an appreciable distance below the surface of the guides 3, and is preferably covered with asbestos or some other heat insulating material, as shown in Fig. 3, to project the portion of the film carrying the picture from the action of the heat radiating from the housing 1, as will be presently described. Coöperating with the guides 3 is a shoe 4 comprising an intermediate web 5 preferably covered with asbestos, and guides 6 on each side of the intermediate web corresponding with the guides 3 adapted to engage the margins of the film opposite the guides 3. Beyond the guide 6 the shoe 4 is provided with suitable flanges 7 which engage the outer vertical faces of the guides 3 to hold the shoe in place.

The flanges 7 are notched in the middle as shown at 8 in Fig. 4 to engage pins 9 projecting from the sides of the guides 3. Suitable springs 11 are attached to the housing 1 at one end adjacent the ends of the guides 3 and project upwardly and engage with their free ends, the end face of the cap 4. The notches 8 are considerably wider than the diameter of the pins 9 and the springs 11 act to hold the edges of the notches in engagement with the pins. At each end of the housing 1 suitable rollers 13, 14, are mounted with their under surfaces in line with the meeting faces of the guides 3 and 6, the rollers 13, 14, being supported at one end only on suitable brackets 15 attached to the housing 1 so that the films may be slipped beneath the rollers from the side.

The bore of the housing 1 is substantially cylindrical and fitting one end of the same is a socket plug 16 for an incandescent electric globe 17 for heating the housing, the opposite end of the housing being closed by a suitable cap 18 to prevent the escape of the air heated by the globe 17 so that the heat of the lamps can only be diffused by radiation through the walls of the housing. The housing 1 is formed with a jacket 19 surrounding the central bore for the reception of paraffin or a similar solvent-lubricant and extending through holes in guides 3 and down into the chamber of the jacket are a plurality of wicks 20 whose upper ends are flush with the surface of the guides. The jacket is formed with an offset portion 21 having a suitable mouth, closed with a plug, for receiving the paraffin. An opening 24 is also provided with a plug formed through a solid portion of the wall of the housing into the central bore into which a thermometer may be inserted or through which the light may be observed.

In operation the device is assembled in the manner described, and the film to be treated is guided beneath the feed rollers 13, 14, and between the guides 3 and 6, the shoe 4 being lifted off by its handle to facilitate placing the film in position. The light is now turned on and after the housing has become sufficiently heated the film is fed toward the right as viewed in Fig. 1 by a suitable feed mechanism, not shown, for instance, the rewinding device commonly employed in moving picture mechanism to rewind the film after it has been exhibited in the machine. The size of the lamp 17 is so proportioned relative to the radiating surface of the housing 1 that the guides 3 and 6 become heated to a degree well above that to which the corresponding guides in the projecting machine become heated under any condition of actual use.

The heated guides have the same effect upon the film as that of the guides of the projecting machine described above, melting out portions of the cement between the spliced ends of the film sections, and also portions of the emulsion or other foreign matter which may be on the margins of the film. The film is placed in the apparatus with the emulsion side up hence the matter so melted off the film causes it to adhere to the shoe 4, but as soon as it does so the shoe will move in the direction of the feed of the film against the tension of the springs 11 until the pin 9 engages the opposite end of the notch 8, when the movement of the shoe will be stopped and the continued movement of the film will release it therefrom. As the film is fed continuously through the device and not intermittently its adherence to the shoe 4 is not sufficient to cause injury to the film, but is merely enough to cause movement of the shoe 4 against the tension of its spring. Immediately the film is released the springs 11 throw the shoe back to its position shown in the drawing, but the accumulation on the shoe will cause it to immediately adhere again to the film and move again to the right as described. As the film is fed with considerable rapidity this repeated reciprocation of the shoe 4 and engagement of the ends of the notches 8 with the pin 9 produces a chattering noise which will call the attention of the operator who then stops the movement of the film feeding device, lifts the shoe off the machine and cleans the accumulation from the guides 6. For this purpose a cleaning pad of the exact width of the guides may be conveniently used the same being attached to the table adjacent the housing so that the operator can run the shoe 4 over the face of the pad to wipe the accumulation therefrom. After the shoe 4 is cleaned it can be placed back on the housing and the device operated as before.

The paraffin in the jacket 19 is kept liquid by the heat of the lamp and is carried up by the wicks to the film-engaging surfaces. As the margins of the film are provided with perforations for the teeth of the feed sprockets the paraffin spreads over the faces of the guides 6, as well as the guides 3, and serves the double purpose of dissolving the foreign matter from the margins of the film and waxing the faces which are engaged by the guides of the projecting machine, so that the film is fed with much less friction.

I have found that when a film is treated in the manner described it may be used repeatedly in the projection machine without any more of the cement or emulsion being melted therefrom for the reason that the guides 3 and 6 are heated well above the temperature of the corresponding parts of the machine and consequently melt off all matter which is fusible at any lower temperature. This can be safely done as the faces of the housing 1 and the shoe 4 opposite the picture portion of the film are entirely covered by asbestos.

It will of course be understood that in place of an incandescent light I may use other suitable means for heating the housing 1, such for instance as an ordinary electric rheostat or a steam pipe connection. It would be obvious also that in place of depending upon the chattering of the shoe 4 to call attention of the operator to the accumulation of cement on the shoe, I may arrange any other suitable signal device operated by the movement of the shoe relative to the housing.

The apparatus forming the subject matter of this application is for the most part described but not claimed in my prior application, Serial No. 732,429, filed November 18, 1912.

Having thus described my invention, what I claim and desire to secure by Letters Patent is:—

1. In an apparatus of the class described, the combination of a member having faces for engaging the marginal portions of a film when moved thereover, a second member having corresponding faces for engaging the opposite sides of said marginal portions, and means for heating said faces.

2. In an apparatus of the class described, the combination of a member having faces for engaging the marginal portions of a film when moved thereover, a second member having corresponding faces for engaging the opposite sides of said marginal portions, means for heating said faces and a signal device operated by the adhesion of said film to said members.

3. In an apparatus of the class described, the combination of a member having faces for engaging the marginal portions of a film when moved thereover, a second member having corresponding faces for engaging the opposite sides of said marginal portions, means for heating said faces and means for guiding said film between said members.

4. In an apparatus of the class described, the combination of a housing adapted to be connected to a heating device, a pair of raised guides or tracks carried by said housing and spaced apart a distance to engage the marginal portions of a motion picture film, a removable member adapted to fit over said raised guides and having corresponding guides for bearing upon the opposite faces of said marginal portions, and a signal device operated by movement of said member relatively to said housing.

5. In an apparatus of the class described, the combination of a housing adapted to be connected to a heating device, a pair of raised guides or tracks carried by said housing spaced apart a distance to engage the marginal portions of a motion picture film when fed thereover, a removable member adapted to fit over said raised guides and having corresponding guides bearing upon the opposite faces of said marginal portions, and means for permitting a limited longitudinal movement of said member and sounding a signal when said member is so moved by the adherence of the film thereto.

6. In an apparatus of the class described, the combination of a housing adapted to be connected to a heating device, a pair of raised guides or tracks carried by said housing spaced apart a distance to engage the marginal portions of a motion picture film when fed thereover, a removable member adapted to fit over said raised guides and having corresponding guides bearing upon the opposite faces of said marginal portions, and a spring for holding said member against movement in the direction of the feed of said film, said member having a pin and slot connection with said housing whereby the reciprocation of said member affected by the adherence of said film thereto produces a chattering noise or signal.

7. In an apparatus of the class described, the combination of a member having faces for engaging the marginal portions of a film when moved thereover, a second member having corresponding faces for engaging the opposite sides of said marginal portions, means for heating said faces, and means for applying a solution to the heated faces.

Signed at New York in the county of New York and State of New York this October, 1913.

NICHOLAS POWER.

Witnesses:
A. J. LANG,
E. W. CANALES.